UNITED STATES PATENT OFFICE.

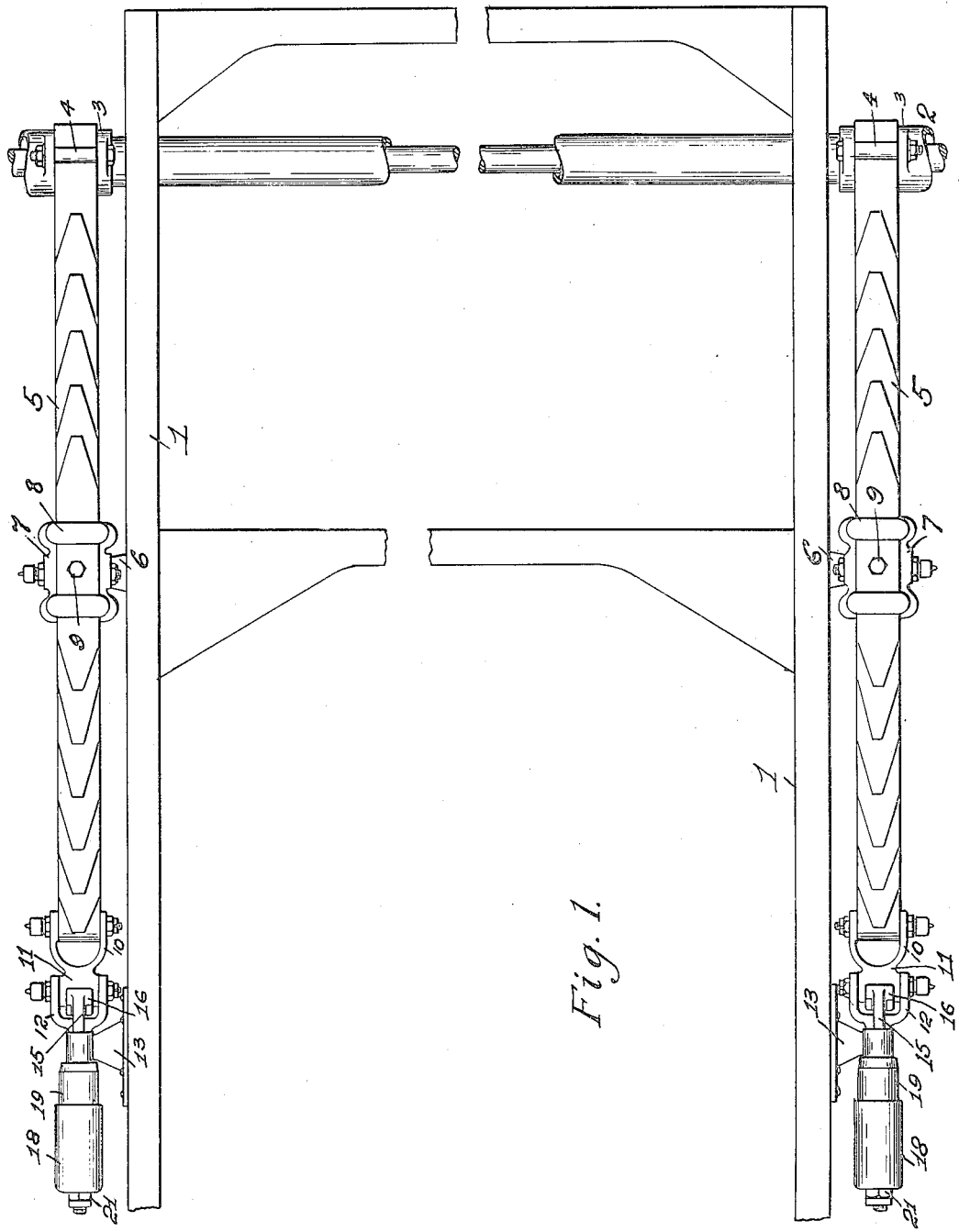

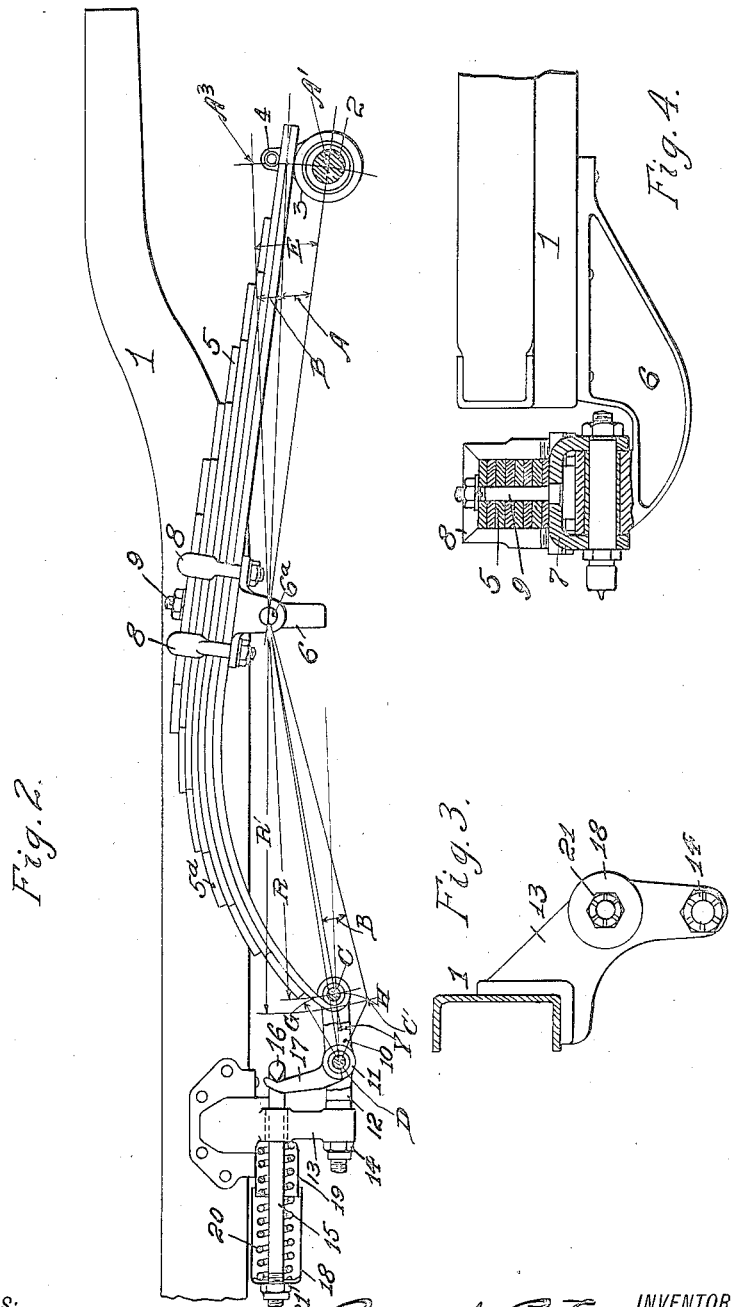

ERNEST E. WEMP, OF PONTIAC, MICHIGAN.

SPRING SUSPENSION FOR VEHICLE-BODIES.

1,211,649.  Specification of Letters Patent.  Patented Jan. 9, 1917.

Application filed February 9, 1916. Serial No. 77,140.

*To all whom it may concern:*

Be it known that I, ERNEST E. WEMP, citizen of the United States, residing at Pontiac, county of Oakland, State of Michigan, have invented a certain new and useful Improvement in Spring Suspension for Vehicle-Bodies, and declare the following to be a full, clear, and exact description of the same, such as will enable others skilled in the art to which it pertains to make and use. the same, reference being had to the accompanying drawings, which form a part of this specification.

My invention relates to a spring suspension for vehicle bodies shown in the accompanying drawings and more particularly pointed out in the following specification and claims.

In the usual method of suspending the bodies of motor driven vehicles, all vertical motions thereof relative to the axles are provided for by springs, whose oscillations are frequently violent due to inequalities of the road surface, the recoil of which causes the body to oscillate.

One object of the present invention is to provide a cantaliver spring construction which may be employed at both forward and rear ends of the vehicle, or at one end only, in conjunction with any other suitable type of spring suspension, a feature of the installation being the "hook up" of the front end of the cantaliver spring with the frame.

Another object of the invention is the reduction of weight over present types of construction.

Other advantages and improvements will hereafter appear.

In the drawings accompanying this specification:—Figure 1 is a fragmentary plan view of the frame of a motor driven vehicle showing the spring suspension as connected with the rear axle of the vehicle. Fig. 2 is a side elevation of a fragment of the frame with parts in section, showing the rear axle and cantaliver connected therewith, the view being diagrammatic in character. Fig. 3 is a detail of the bracket for supporting the spring shackle. Fig. 4 is a detail cross-sectional view through the laminated cantaliver spring, showing a fragment of the frame and supporting bracket upon which the spring rocks.

Referring now to the reference characters placed upon the drawings:—1, denotes the frame, 2, the rear axle, 3, a collar fitted to the rear axle provided with a bracket carrying an anti-friction roll 4.

5, denotes a laminated spring of cantaliver construction, the rearwardly projecting end of which extends under the anti-friction roll 4.

6, is a depending bracket secured to the frame in which is journaled a rocking member 7, to which the laminated spring is secured by clip bolts 8, and a central bolt 9, extending through apertures in the respective leaves of the spring to secure against shifting with reference to each other. The forward end of the spring is given considerable camber and is engaged with the rearwardly projecting arm 10, of the yoke bellcrank 11, pivoted in shackle yoke 12.

13, is a yoke bracket secured to the frame 1, adapted to receive the screw-threaded stem of the shackle yoke 12.

14, indicates nuts engaging the stem.

15, denotes a rod slidably supported in the wall of the yoke bracket 13, having a knife edge cross-arm 16, engaging the upwardly extending arm 17, of the yoke bell-crank 11.

18, 19, are telescopic sleeves housing an auxiliary spring 20, through which the rod 15, extends, being fitted on the outside of the telescopic members with nuts 21, adapted to regulate the tension of the spring.

The construction and operation of the device will now be explained.

As previously indicated one of the features of the invention consists in the "hook up" of the front end of the cantaliver spring with the frame, the mechanical construction of which will be readily understood by reference to the drawings.

The operation of the device is as follows:—The rear axle 2, upon striking an obstruction causes a deflection of the cantaliver spring proper, which may be measured by the angle A. The deflection of that part of the cantaliver 5, which is designed with considerable camber, causes an elongation of $5^a$, increasing the normal radius R to R'. The radius R', intersects the arc of travel G, H, of the spring shackle at C'. The elongation of $5^a$, is therefore accompanied by a rotation of the spring shackle 10, against the resistance of the auxiliary spring 20, through the angle Y, and a consequent rotation of the cantaliver spring about its pivot $6^a$, through the angle B. The total axle movement from A' to $A^3$, or through the angle E, is thus seen to be composed of the two components, one of the spring deflection A, and one of spring rotation B. The natural flexibility of the spring, which will deflect A°, under a given shock force, is increased by the "hook up", to the flexibility of a spring which will deflect E°, under the same shock force.

Referring now to the saving in spring weight:—The ratio of $\frac{B}{E}$ is practically the measure of saving in spring weight over a conventional half-elliptic cantaliver design, which would deflect E° under the given shock force. The proof of this lies in the fact that, with a given carrying capacity, changes in flexibility are accompanied by proportional changes in weight. The ratio of the weight of the two springs then, whose deflections under a given load are respectively A°, and E°, is A:E. Since A°+B°=E°, B° represents the difference in flexibility, and $\frac{B}{E}$, the ratio of the difference in flexibility, and consequently the ratio of the saving in spring weight.

The decided camber of the front end 5ª of the cantaliver, will ordinarily prevent the similarity of outline of the two designs, and the above ratio will not be exact, but will be found to be nearly so.

Of equal importance with the saving of spring weight, is the action of this design on rebound. Referring again to Fig. 2 of the drawings, upon rebound from the above shock force, the front end of the cantaliver will travel upwardly from C' to C, and beyond, the radius R', decreasing to R, and smaller, until the line of centers of the spring shackles D, C, becomes coincident with the fixed line of centers D, 6ª. In this position, the three points D, C, and 6ª, are in a straight line and the radius C, 6ª, is the shortest radius possible. Any tendency of the point C, to pass upwardly beyond this straight line position, is opposed by the resistance of the cantaliver 5, to elongation, and flexibility of the suspension from the pivot point 6ª, forward, is nullified. The flexibility of the system is thus reduced to the flexibility of the cantaliver proper from the pivot 6ª, to the rear axle. Rebound from small obstructions will not cause the point C, to pass the straight line position, and so flexibility is not interfered with under ordinary good road conditions.

It is possible with this construction to increase the flexibility of the rear system beyond where it would be practical with a conventionally mounted cantaliver, and so obtain very easy riding under ordinary road conditions, while the rebound feature will take care of what otherwise will cause excessive upthrow, unless special means are employed for reducing the upthrow.

The easy assembly of this system is secured through the shackle yoke 12, which is slid forward while connecting the shackle and the front end of the spring, and drawn to place by means of the yoke nut 20, when all of the connections are made.

The yoke bracket 13, may incorporate the rear step-hanger without interfering with its functions.

It will be obvious that the position of the auxiliary spring is not important so long as it is positioned to maintain the normal non-coincident center line position of the shackle.

Having thus described my invention, what I claim is:—

1. In a vehicle, two pivotal connections maintained by a supporting member at a fixed operating distance, a laminated spring articulating with one of the said pivotal connections, a shackle articulating with the other said pivotal connection and with one end of the laminated spring, whereby the elongation of the laminated spring upon compression will combine with rotation of the shackle to produce flexibility, while rebound of the laminated spring will be opposed when the center lines of the fixed pivotal connections and of the shackle become co-planal, and means for yieldingly resisting the rotation of the shackle upon the action of compression of the laminated spring.

2. In a vehicle, two pivotal connections maintained by a supporting member at a fixed operating distance, a laminated spring, means for connecting the laminated spring with one of said pivotal connections, rotatable connecting means joining the other said pivotal connection and one end of the laminated spring, whereby, upon compression, the elongation of the laminated spring will combine with rotation of the connecting means to produce flexibility, while rebound of the laminated spring will be opposed when the center lines of the fixed pivotal connections and of the connecting means become coplanal, and means for yieldingly resisting the rotation of said connecting means upon the action of compression of the laminated spring.

3. In a vehicle, a frame, two pivotal connections supported by the frame at a fixed operating distance, an axle, a cambered cantaliver spring, means for connecting one end of said spring with the axle, means for connecting said spring intermediately with one of said frame connections, a bell-crank shackle mounted intermediately in the other said frame connection and having one arm pivotally connected with the other end of said spring, and means, comprising a bolt co-acting with the other arm of said bell-crank, an auxiliary spring sleeved upon the bolt and adapted to be compressed by the action of the latter, and an adjustable device for regulating the tension of the auxiliary spring, in combination with the cambered spring for yieldingly resisting a non co-planal position of the pivotal center lines.

4. In a vehicle, a frame, two pivotal connections supported by the frame at a fixed operating distance, a laminated spring articulating with one of said pivotal connections, a shackle articulating with the said other pivotal connection and with one end of the laminated spring, whereby the elongation of the laminated spring upon compression will combine with the rotation of the shackle to produce flexibility, while rebound of the laminated spring will be opposed when the line of centers of the fixed frame connections and the line of centers of the shackle become coincident, and means for maintaining the shackle resiliently in a normal non-coincident center line position.

5. In a vehicle, a frame, two pivotal connections supported by the frame at a fixed operating distance, a laminated spring connected with one of said pivotal frame connections, a shackle pivotally connecting one end of the laminated spring with the other pivotal frame connection, an auxiliary spring, means for connecting the auxiliary spring and the shackle, whereby the auxiliary spring will maintain the shackle in a normal non-coincident center line position with respect to the line of centers of the fixed frame connections, and whereby flexibility of the laminated spring will be opposed when the said center lines become coincident.

In testimony whereof, I sign this specification in the presence of two witnesses.

ERNEST E. WEMP.

Witnesses:
HOWARD H. BARNETT,
L. E. THURBER.